United States Patent
Yilmaz (10) Patent No.: US 9,442,535 B2
(45) Date of Patent: Sep. 13, 2016

(54) TOUCH SENSOR WITH INTEGRATED ANTENNA

(71) Applicant: Esat Yilmaz, Santa Cruz, CA (US)

(72) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 188 days.

(21) Appl. No.: 13/725,397

(22) Filed: Dec. 21, 2012

(65) Prior Publication Data

US 2014/0176819 A1 Jun. 26, 2014

(51) Int. Cl.
*G06F 1/16* (2006.01)
*G06F 3/044* (2006.01)

(52) U.S. Cl.
CPC ........... *G06F 1/1692* (2013.01); *G06F 1/1698* (2013.01); *G06F 3/044* (2013.01); *G06F 2203/04103* (2013.01)

(58) Field of Classification Search
CPC .... G06F 1/1692; G06F 1/1698; G06F 3/044; G02F 1/13338
USPC ....... 349/12; 345/173–178; 178/18.01–18.11
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2009/0167699 A1* | 7/2009 | Rosenblatt et al. | 345/173 |
| 2009/0315854 A1 | 12/2009 | Matsuo | |
| 2012/0133597 A1* | 5/2012 | Chen | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0287066 A1* | 11/2012 | Yang et al. | 345/173 |
| 2012/0299863 A1* | 11/2012 | Yilmaz | G06K 19/07758 345/174 |
| 2013/0076612 A1 | 3/2013 | Myers | |
| 2014/0111953 A1* | 4/2014 | McClure et al. | 361/749 |

FOREIGN PATENT DOCUMENTS

WO   WO 2012/129247       9/2012
WO   WO 2012129247 A2 *   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

Primary Examiner — Thoi Duong
(74) Attorney, Agent, or Firm — Baker Botts L.L.P.

(57) ABSTRACT

In one embodiment, an apparatus includes one or more flexible substrates having flexible conductive material disposed thereon and a radiating element disposed on a first region of the flexible substrates. The radiating element includes a first portion of the flexible conductive material. The apparatus includes a touch-sensing area disposed on a second region of the flexible substrates. The touch-sensing area includes multiple electrodes that each include a respective second portion of the flexible conductive material disposed on the flexible substrates. The electrodes are configured to sense touch of an object at the touch-sensing area.

25 Claims, 8 Drawing Sheets

TOUCH SENSOR WITH INTEGRATED ANTENNA

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Various example embodiments disclosed herein are explained in the context of a substrate having both a touch sensor and a radiating element, such as an antenna, disposed thereon. Certain embodiments disclosed herein may provide both touch position sensing capabilities and antenna capabilities to a panel having a compact design. Manufacturing costs may be reduced by enabling the formation of all or respective portions of a touch sensor and an antenna during the same process steps, as discussed further below. The present disclosure should in no way be limited to the example implementations, drawings, and techniques illustrated below. The drawings are not necessarily drawn to scale.

Example embodiments of the present disclosure are best understood by referring to FIGS. 1-10 of the drawings, like numerals being used for like and corresponding parts of the various drawings.

Figure 1:
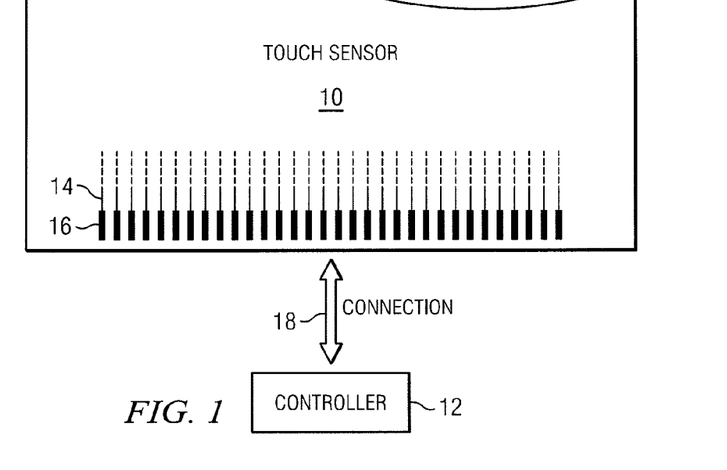
FIG. 1 illustrates an example touch sensor with an example touch-sensor controller, according to one embodiment.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, thin line other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
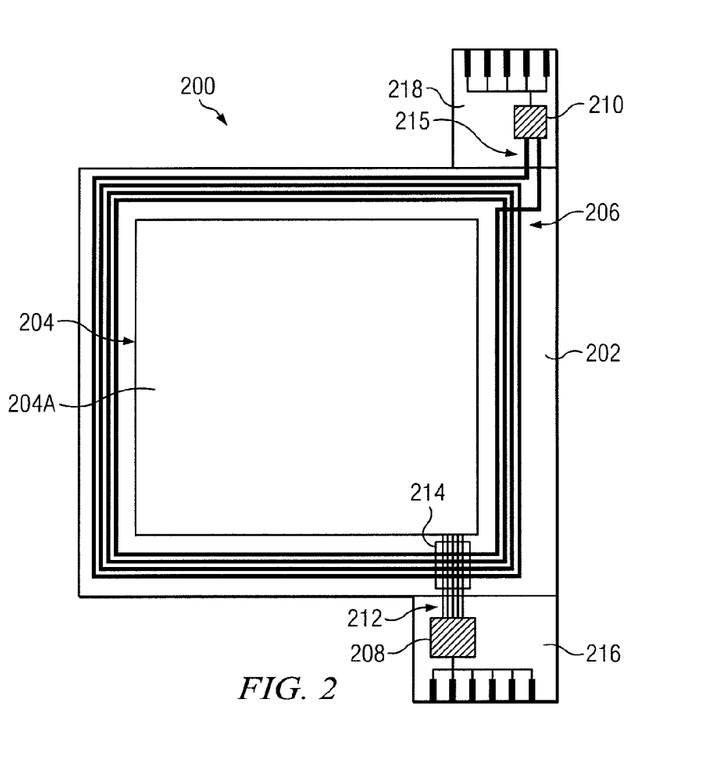
FIG. 2 illustrates an example of a panel that includes the touch sensor of FIG. 1 and a radiating element, formed on one or more substrates according to one embodiment.

FIG. 2 illustrates an example of a panel 200 that includes a touch sensor 204 and a radiating element 206 each formed on a substrate 202. Touch sensor 204 may include a touch sensing area 204A having one or more of the various electrodes described previously with reference to FIG. 1. In the example shown in FIG. 2, at least a portion of radiating element 206 is disposed on a surface of substrate 202 that is proximate to an outer perimeter of touch sensing area 204A. Touch sensor 204 and radiating element 206 are communicatively coupled to respective controller circuits 208 and 210 disposed on circuit boards 216 and 218, respectively. One or more connecting lines 212 may be used to form electrical connections between touch sensor 204 and touch controller 208. In addition, one or more connecting lines 215 may be used to form electrical connections between radiating element 206 and radiating element controller 210. Although radiating element 206 is shown as having overlapping lines, the portions that overlap are electrically isolated from each other.

Substrate 202 may be made of one or more layers of dietetic material, such as glass or a plastic; however, any suitable substrate may be used. Plastic substrates and cover sheets may be suitable where flexibility of the panel may be required. Examples of suitable plastic substrate materials that may be flexible include, but are not limited to, polyethylene terephthalate (PET), polyethylene naphthalate (PEN) and polycarbonate (PC). Examples of suitable plastic materials for a transparent or semi-transparent cover sheet that may be flexible include, but are not limited to, polycarbonate and poly(methyl methacrylate) (PMMA). If substrate 202 is at least semi-transparent, light may be transmitted through the touch sensing area 204A so that light emitted from a light source (e.g. display 420 of FIG. 4, a backlight, or other light source) underlying touch sensor 204 is visible to a user of the touch sensor 204. Example displays that may be used with panel 200 include, without limitation, liquid crystal displays, electronic ink displays, organic light-emitting diode displays, plasma displays cathode ray tube displays. As shown in FIG. 2, all or substantially all of radiating element 206 may be disposed on substrate 202 outside touch sensing area 204A, which may block or filter light transmitting through substrate 202 at a corresponding location.

Touch sensor 204 may include certain structure and functionality of touch sensor 10 described previously with reference to FIG. 1. For example, touch sensor 204 may include an array of drive and sense electrodes (or an array of electrodes of a single type) disposed on one or more substrates 202. In addition, the controller circuit 208 and connecting lines 212 of touch sensor 204 may be substantially similar in structure and function to touch-sensor controller 12 and tracks 14 of FIG. 1.

Radiating element 206 may include one or more antennas configured to convert electric currents into radio waves or vice versa. For example, radiating element may include one or more radio-frequency identification ("RFID") tags (e.g. passive, semi-passive, or active RFID tags), near field communication ("NFC") enabled antennas, wireless fidelity ("Wi-Fi") enabled antennas, loop antennas, inductive charge receivers, or other suitable antennas configured to convert electric currents into radio waves or vice versa. As shown in FIG. 2, radiating element 206 may include a coil of conductive material arranged on a surface of substrate 202 around an outer perimeter of touch sensing area 304A.

As shown in FIG. 2, radiating element 206 may include a coil of conductive material surrounding touch sensor 204. In certain embodiments, the conductivity of the radiating element 206 may reduce or prevent the discharging of an electro-static charge built up at an electrode of touch sensor 204. In certain embodiments, an insulating layer 214 may be provided between radiating element 206 and connecting line(s) 112 leading out from the touch sensor 204. Insulating layer 214 may be configured to minimize the effect of radiating element 206 on the discharging of build-up of electrostatic charge from touch sensor 204.

All or respective portions of the electrodes of touch sensor 204, radiating element 206, connecting lines 212, or connecting lines 215 may each be disposed on the same surface of substrate 202, in certain embodiments. Alternatively, all or respective portions of the electrodes of touch sensor 204, radiating elements 206, connecting lines 212 or connecting lines 215 may each be formed on respective surfaces of substrate 202 that are different from each other. For example, all or a portion of touch sensor 204 may be formed on a front surface of substrate 202 and all or a portion of radiating element 206 may be formed on a back surface of substrate 202 that is opposite from the front surface.

In certain embodiments, all or respective portions of touch sensor 204 and radiating element 206 may be formed on substrate 202 during the same processing steps. If certain deposition and etching steps are used in forming touch sensor 204 and radiating element 206 on the same surface of substrate 202, for example, the same deposition or etching steps may be used in substantially simultaneously forming touch sensor 204 and radiating element 206.

Controller circuits 208 and 210 may each be mounted on one or more respective circuit boards 216 and 218, respectively. In certain embodiments, circuit boards 216 and 218 are FPC boards that are each bonded to substrate 202, for example, by an anisotropic conductive film (ACF). In alternative embodiments, all or respective portions of touch controller 208 or radiating element controller 210 may each be disposed on substrate 202 or on the same FPC board. Circuit boards 216 and 218 may facilitate the electrical coupling of touch sensor 204 and radiating element 206 to control units 108 and 110, respectively. Although FIG. 2 illustrates separate control units 208 and 210, in alternative embodiments touch sensor 204 and radiating element 206 may each be connected to the same control unit(s) configured to provide the functionality of control units 208 and 210. Such a combined controller may be located, for example, on either a FPC board, substrate 202, or some other location as long configured to enable connectivity to the controller. In certain embodiments, touch sensor 204, radiating element 206, controller circuit 208, or controller circuit 210, may be connected to the same power source as each other.

The control unit 208 associated with touch sensor 204 may provide one or both of the functions of driving electrodes of the touch sensor 204 and processing signals received from the touch sensor 204 to determine the position of a touch, as described previously with reference to FIG. 1.

Figure 3:
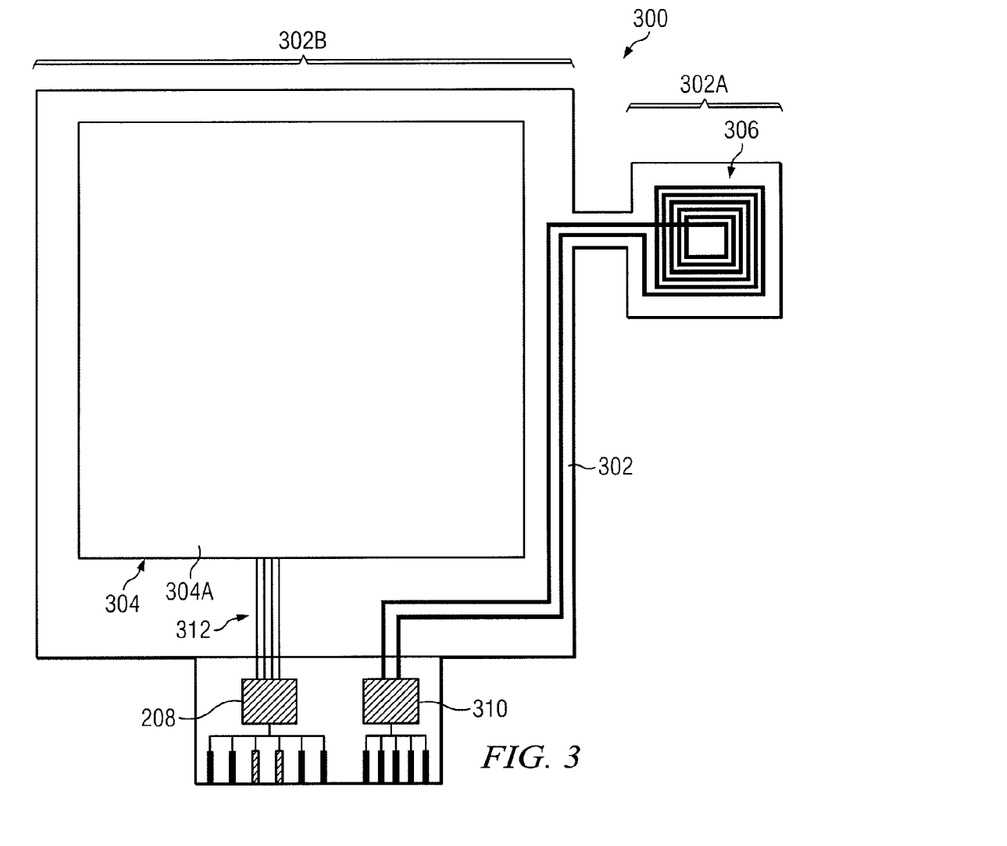
FIG. 3 illustrates another example of a panel that includes the touch sensor of FIG. 1 and a radiating element, both formed on a substrate according to an alternative embodiment.

FIG. 3 illustrates another example of a panel 300 that includes a touch sensor 304 and a radiating element 306 each formed on a substrate 302, according to an alternative embodiment. Touch sensor 304 may include a touch sensing area 304A having one or more of the various electrodes described previously with reference to FIG. 1. In the example shown in FIG. 3, radiating element 306 is disposed on a peninsula-shaped surface 302A of substrate 302. The peninsula-shaped surface 302A of substrate 302 is separate from and adjacent to a larger surface area 302B of substrate 302 upon which touch sensing area 304A is disposed. As with the example of FIG. 2, some or all of the electrodes of touch sensor 304, and associated connecting lines 312 for connecting the electrodes to a controller 308, may be provided on one or more surfaces of substrate 302. Controllers 308 and 310 may each be located on one or more FPC boards coupled to substrate 302 in a manner substantially similar to that described previously with reference to FIG. 2. Touch sensor 304, controller 308, and connecting lines 312 may include certain structure and functionality of touch sensor 10, touch-sensor controller 12, and tracks 14 of FIG. 1. Although radiating element 306 is shown as having overlapping lines, the portions that overlap are electrically isolated from each other.

Radiating element 306 may include one or more antennas configured to convert electric currents into radio waves or vice versa. For example, radiating element may include one or more radio-frequency identification ("RFID") tags (e.g. passive, semi-passive, or active RFID tags), near field communication ("NFC") enabled antennas, wireless fidelity ("Wi-Fi") enabled antennas, loop antennas, inductive charge receivers, or other suitable antennas configured to convert electric currents into radio waves or vice versa. As shown in FIG. 3, radiating element 306 may include a coil of conductive material arranged on the peninsula-shaped surface 302A of substrate 302.

Figure 4:
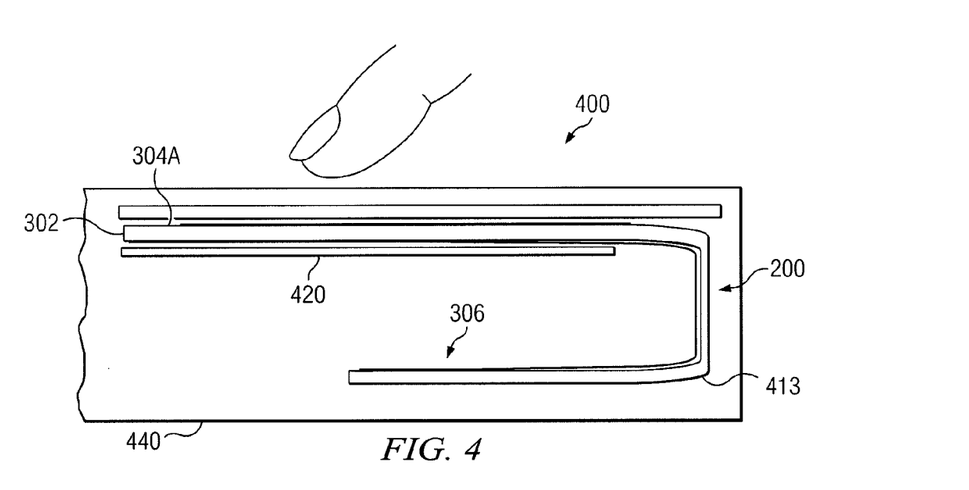
FIG. 4 illustrates schematically a cross section of a display device containing the panel of FIG. 3.

FIG. 4 illustrates a touch-sensitive display device 400 that includes the panel 300 of FIG. 3 and a display 420. In this example, substrate 302 is made of flexible material such that substrate 302 may be folded upon itself. As shown in FIG. 4, for example, substrate 302 may be folded such that all or a portion of touch sensor 304 overlies all or a portion of radiating element 306, or vice versa. Display 420 may be arranged within display device 400 such that display 420 is positioned between opposing faces of the folded substrate 302. In certain embodiments, at least part of the housing 440 of display device 400 may be transparent to allow light emitted by display 420 through touch sensing area 304 to be visible to a device user; and radiating element 306 may be located within a part of the housing 340 that is not visible to the device user. Example displays 420 that may be used with display device 400 include, without limitation, liquid crystal displays, electronic ink displays, organic light-emitting diode displays, plasma displays cathode ray tube displays.

In particular embodiments, all or a portion of radiating element 306 or its connecting lines may be disposed on a surface of substrate 302 after substrate 302 is curled or folded, which may avoid stretching or breakage of the antenna connectivity that may occur during curling or folding of the substrate 302.

Figure 5:
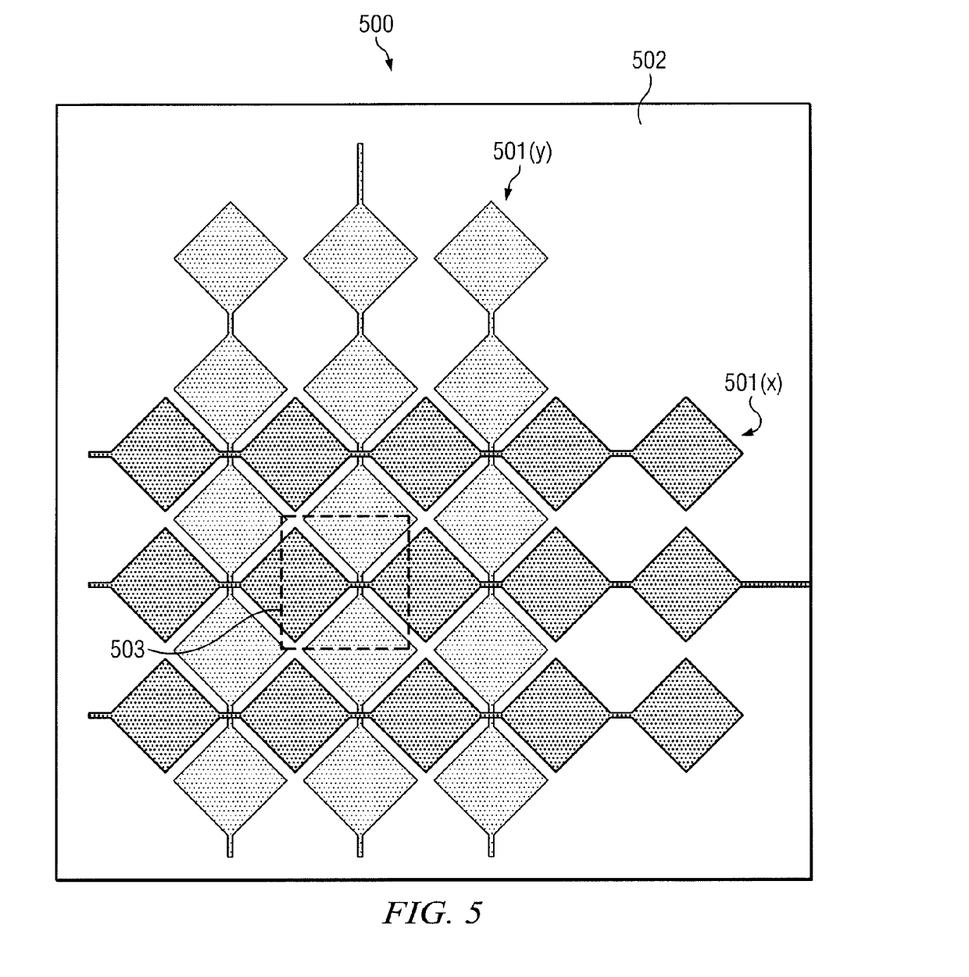
FIG. 5 illustrates schematically a plan view of a portion of an example touch sensor of FIG. 1.

FIG. 5 shows an arrangement of drive electrodes 501(x) and sense electrodes 501(y) of a capacitive touch position sensor 500. Electrodes 501 may be used by certain embodiments of touch sensors 10, 204, or 304 of FIGS. 1, 2 and 3, respectively. Drive electrodes 501(x) and sense electrodes 501(y) of capacitive touch position sensor 500 may be arranged in electrical isolation from each other on the same surface of substrate 502; however, multiple surfaces can also be used. The sense and drive electrodes may have any shape and arrangement. For example, drive electrodes 501(x) may surround sense electrodes 501(y). Capacitive sensing channels 503 are formed in the sensing area at the regions where edges of drive electrodes 501(x) and sense electrodes 501(y) are overlap without shorting or are placed in close proximity to one another.

In alternative embodiments, drive electrodes 501(x) and of sense electrodes 501(y) may be arranged on opposite surfaces of an insulating substrate so that the substrate upon which drive electrodes 501(x) and sense electrodes 501(y) are formed provides the electrical isolation of the drive and sense electrodes from each other. In another example, the drive electrodes 501(x) and sense electrodes 501(y) may be formed on different substrates with an insulator provided between the drive and sense electrodes. If formed on different substrate surfaces, the electrodes 501(x) and 501(y) may use shapes similar to the electrodes of FIG. 5 or may have other shapes and relationships.

Figure 6A:
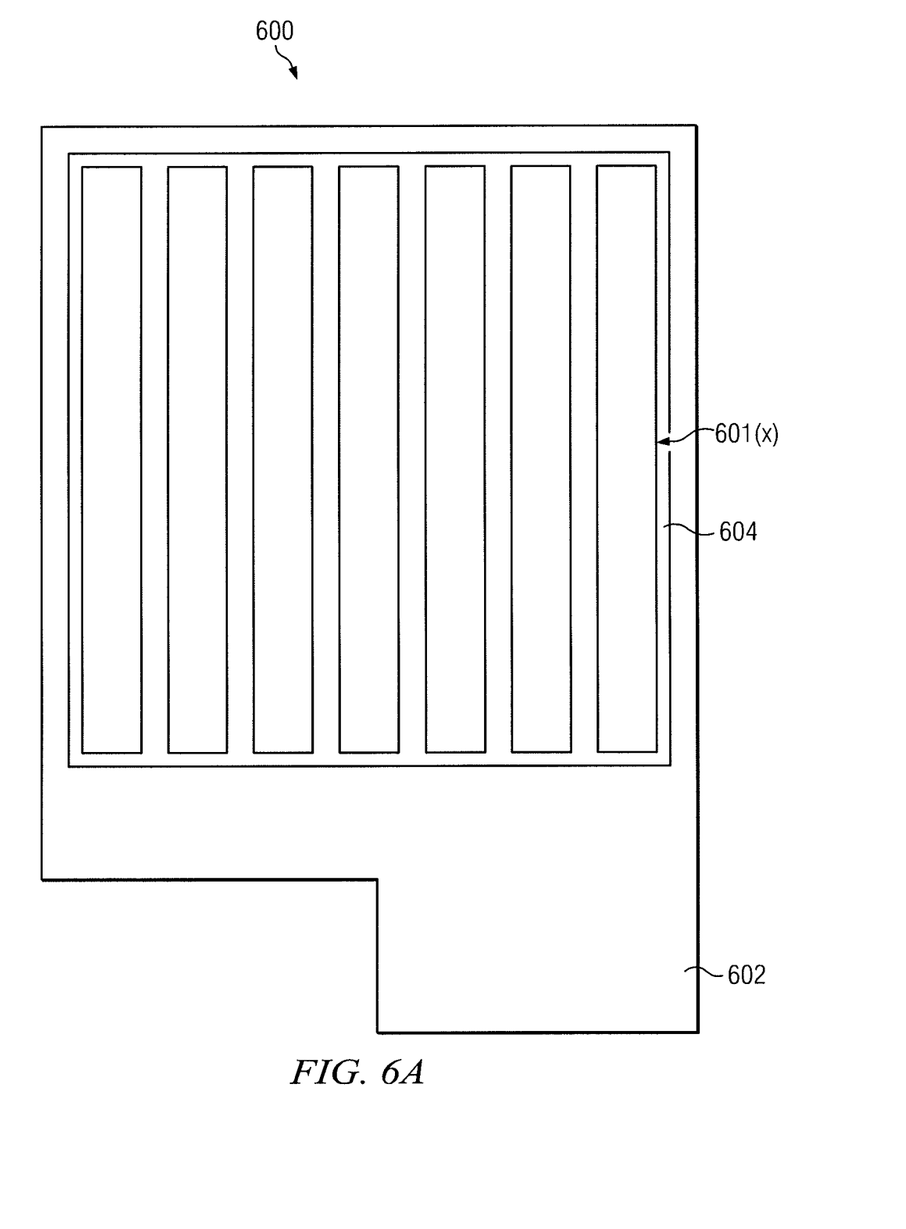
FIG. 6A-6B illustrate schematically the results of a method for manufacturing on the same substrate the touch sensor or the radiating elements shown in FIGS. 1-7, according to one embodiment.
Figure 6B:
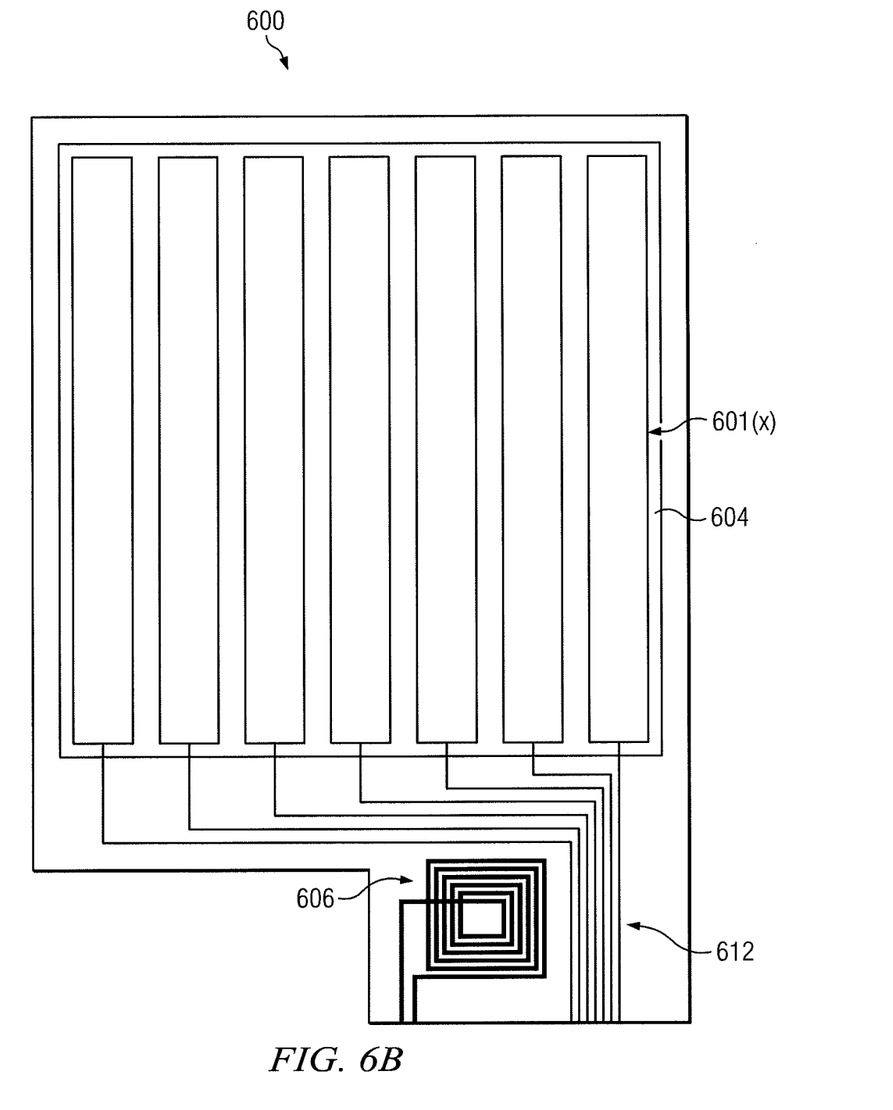

FIGS. 6A and 6B illustrate the results of steps of a method of forming an example panel 600 having a touch sensor 604, a radiating element 606, and connecting lines 612 formed on the same substrate 602. Substrate 602, touch sensor 604, radiating element 606, or connecting lines 612 may be substantially similar in structure and function to certain embodiments of substrate 302, touch sensor 304, radiating element 306, and connecting lines 312 of FIG. 3, respectively, or corresponding components of FIG. 2. With reference to FIG. 6A, in a first step, blocks of a transparent conductive material are formed (e.g. by deposition, photolithography, and etching) on the surface of substrate 602 to form electrodes 601(x) (e.g. a drive electrode or a sense electrode). The space between adjacent drive electrodes 601(x) may be made as narrow as possible, for example, to enhance shielding of the sense electrodes (not shown) against noise arising from the underlying display. At least 90% of the sensing area 604A may be covered by transparent conductive material of the drive electrodes, and the gap between adjacent drive electrodes 601(x) may be no more than 300 microns. In such an example, substantially the whole of the area of each intersection with a sense electrode (not shown in these illustrations for simplicity) may be shielded by the solid drive electrode blocks. In certain embodiments, the electrodes 601x of touch sensor 604 may be formed from transparent conductive material, as described above. Although radiating element 606 is shown as having overlapping lines, the portions that overlap are electrically isolated from each other.

Suitable conductive materials used to form radiating element 606 may include fine lines of metal or other conductive material (FLM), such as, for example, copper, silver, gold, aluminum, tin, or one or more of those materials in combination with each other or with other material.

In a step represented by FIG. 6B, radiating element 606 and connecting lines 612 for connection to a FPC (not shown in these illustrations for simplicity) may be formed on the same surface of substrate 602 as each other. In certain embodiments, all or respective portions of radiating element 606 and connecting lines 612 may be formed substantially simultaneously in the same processing step from the same or similar material. For example, respective portions of radiating element 606 and connecting lines 612 may be formed by depositing one or more layers of material. The particular configurations and spacing of radiating element 606 and connecting lines 612 may then be defined by patterning and selectively removing (e.g. by photolithography and one or more etch processes) respective portions of radiating element 606 and connecting lines 612 substantially simultaneously; however, any suitable processing techniques may be used. In certain embodiments, radiating element 606 or connecting lines 612 may be formed from one or more layers of transparent conductive materials as described above with reference to electrodes 601(x). Additionally or alternatively, all or respective portions of radiating element 606 or connecting lines 612 may be formed from one or more layers of opaque conductive materials including without limitation copper, silver, gold, aluminum, tin and other metals suitable for use in conductive wiring. In the example of FIG. 6B, radiating element 606 is disposed on a peninsular extending portion of panel 600 and the peninsular extending portion of panel 600 is a continuous extension of substrate 602. Although this disclosure describes and illustrates peninsular extending portion of panel 600 as a continuous extension of substrate 602, this disclosure contemplates any suitable arrangement or configuration of the peninsular extending portion of panel 600 with respect to substrate 602. As an example, all or a portion of the peninsular extending portion of panel 600 may be an FPC bonded to substrate 602 instead of a continuous extension of substrate 602.

Although for explanation purposes the formation of electrodes 601(x) are shown separately in FIG. 6A from the formation of radiating elements 606 and connecting lines 612 shown in FIG. 6B, in certain embodiments all or respective portions of electrodes 601(x) may be formed substantially simultaneously with all or respective portions of radiating element 606 or connecting lines 612. For example, respective portions of electrodes 601(x), radiating element 606, or connecting lines 612 may be formed by depositing one or more layers of material. The particular configurations and spacing of electrodes 601(x), radiating element 606, and connecting lines 612 may then be defined by patterning and selectively removing (e.g. by photolithography and one or more etch processes) respective portions of electrodes 601(x), radiating element 606, or connecting lines 612 substantially simultaneously; however, any suitable processing techniques may be used.

Figure 7:
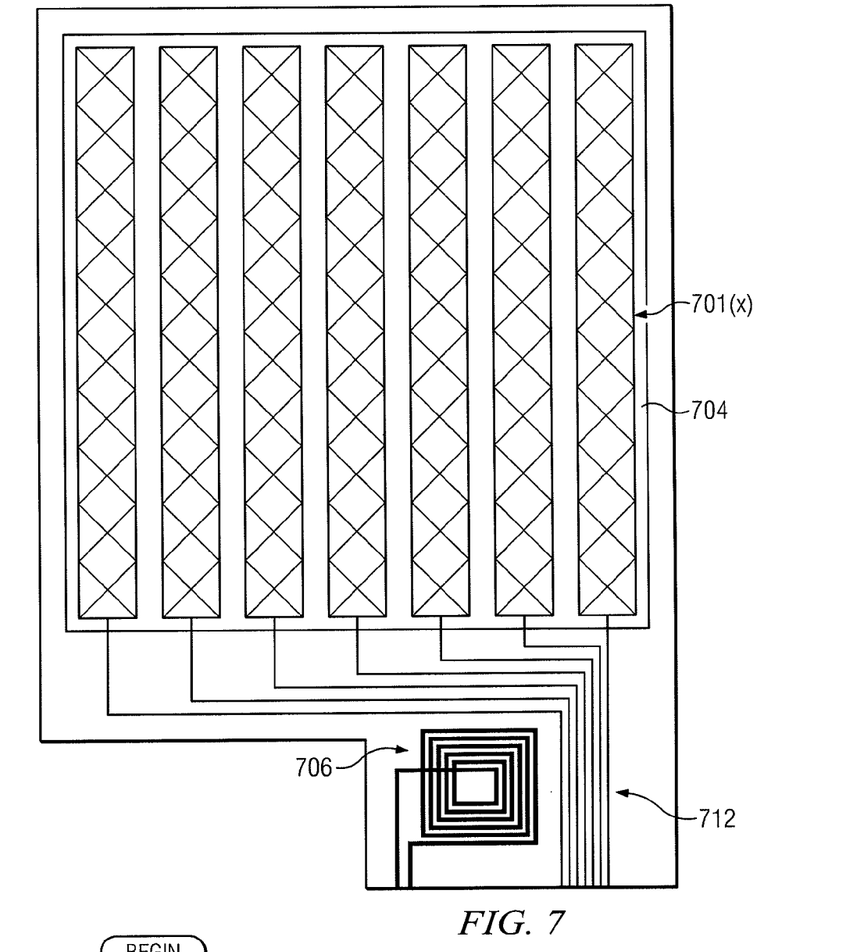
FIG. 7 illustrates schematically a method for manufacturing on the same substrate the touch sensor or the radiating elements shown in FIGS. 1-7, according to an alternative embodiment.

FIG. 7 illustrates a capacitive touch sensing panel 700 that may be similar in structure and function to certain embodiments of the panel 600 illustrated in FIG. 6, with the exception that the electrodes 701(x) of FIG. 7 (e.g. sense or drive electrodes) are formed from a mesh pattern of narrow lines of opaque conductive material. The mesh may be sized and patterned to allow transmission of light through the mesh electrodes 701(x). In this example, two or all of the electrodes 701(x), radiating element 706 and connecting lines 712 may be formed from the same or similar material or during the same processing step. For example, respective portions of electrodes 701(x), radiating element 706, or connecting lines 712 may be formed by depositing one or more layers of the same material. The particular configurations and spacing of electrodes 701(x), radiating element 706, and connecting lines 712 may then be defined by patterning and selectively removing (e.g. by photolithography and one or more etch processes) respective portions of electrodes 701(x), radiating element 706, or connecting lines 712 substantially simultaneously; however, any suitable processing techniques may be used. In the example of FIG. 7, radiating element 706 is disposed on a peninsular extending portion of panel 700 and the peninsular extending portion of panel 700 is a continuous extension of the substrate of the rest of panel 700. Although this disclosure describes and illustrates peninsular extending portion of panel 700 as a continuous extension of the substrate of the rest of panel 700, this disclosure contemplates any suitable arrangement or configuration of the peninsular extending portion of panel 700 with respect to the substrate of the rest of panel 700. As an example, all or a portion of the peninsular extending portion of panel 700 may be an FPC bonded to the substrate of the rest of panel 700 instead of a continuous extension of the substrate of the rest of panel 700. Although radiating element 706 is shown as having overlapping lines, the portions that overlap are electrically isolated from each other.

In an alternative embodiment, one or more of the electrodes (e.g. electrodes 601(x) or electrodes 701(x)) may have both a block of transparent conductive material and a metal pattern of narrow lines in contact with the transparent conductive block In an alternative embodiment, all or a portion of radiating elements 606 or 706 may be disposed on a substrate other than substrates 602 and 702, respectively, such as, for example, on flexible printed circuit board.

In certain embodiments, electrodes of a different type than electrodes 601(x) and 701(x) (e.g. either drive or sense electrodes) may be formed on a different (e.g. opposing) surface of substrates 602 and 702 respectively, or on a separate substrate, to form a touch sensor panel having both drive and sense electrodes. For example, if electrodes 601(x) are drive electrodes, then sense electrodes may be formed on the opposing surface of substrate 602.

Patterns of narrow conductive material lines may form a mesh pattern as illustrated in FIG. 7 or other pattern of narrow lines of an opaque conductive material that is sized and patterned to allow transmission of light through the electrodes. Suitable opaque conductor materials include copper, silver, gold, aluminum, tin and other metals suitable for use in electrical connectivity. The narrow lines may be from about 1 micron wide up to about 20 microns wide. Each electrode may include a mesh or other pattern of narrow lines formed of the appropriate electrode width. Narrower lines may reduce visibility to the naked eye. The fine conductive lines of the electrodes of an electrode layer may be formed such that up to about 10% of the touch sensing area is covered by an electrode material. Widths and spacings to provide coverage in the exemplary range allow for good transparency of the sensing panel. Configuring the line pattern to reduce the coverage percentage toward the lower end of the range, for example, around 3% or lower, increases transparency and reduces perceptible darkening or other loss of display quality.

The width of the drive and sense electrodes may depend on the touch-sensitive application in which the touch position sensor is to be used. The drive or sense electrodes of a mutual capacitance touch position sensor may be up to about 20 mm wide. In an example using a transparent conductive material such as ITO, sense electrodes may be greater than about 0.2 mm wide and drive electrodes may be greater than about 3 mm wide. In an example using fine metal lines, each line may be greater than about 1 μm, but electrode widths may still be in the range of about 3 mm or larger. Similar dimensions may apply to electrodes of a self-capacitance touch position sensor.

Figure 8:
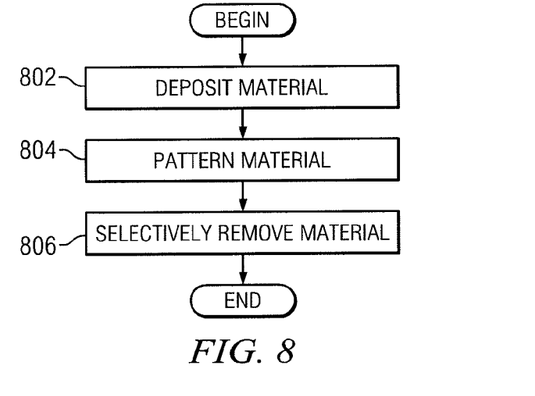
FIG. 8 is a flowchart illustrating a method for manufacturing on the same substrate the touch sensor or the radiating elements shown in FIGS. 1-7.

FIG. 8 illustrates a method for manufacturing any of the panels discussed above with reference to FIGS. 1-7. At step 802, one or more layers of material may be formed on one or more surfaces of the substrate. For example, one or more layers of transparent conductive material may be deposited on or more surface of the substrate. Suitable transparent conductive materials may include without limitation transparent inorganic and organic conductive materials, such as ITO (indium tin oxide), ATO (antimony tin oxide), tin oxide, PEDOT or other conductive polymers, and carbon nanotube or metal nanowire impregnated materials. Additionally or alternatively, one or more layers of opaque conductive material may be deposited, including without limitation copper, silver, gold, aluminum, tin and other metals suitable for use in conductive wiring.

At step 804, one or more of the radiating element, the electrodes of the touch sensor, and the connecting lines may be patterned. If a layer of the electrodes of the touch sensor includes ITO, the process of patterning the electrodes on the respective substrate may include depositing a positive or negative resist over unpatterned ITO on the substrate; exposing the photoresist to LTV light through a mask of the appropriate pattern; developing the resist by washing away unexposed resist with a solvent; and etching away the exposed ITO areas using a suitable etchant. The exposed photoresist may be removed using a suitable solvent. Organic conductive materials such as PEDOT may be patterned using printing methods, such as ink jet or screen printing.

Patterning narrow lines of a conductive material for the electrodes of the touch sensor, patterning the connecting lines for the electrodes or patterning the radiating element may include deposition of the metal or other conductive material (e.g. FLM).

In other examples, the patterning of a narrow line conductive material for the electrodes, patterning of the connecting lines or patterning of the radiating element may be done by a printing process in which a conductive material or conductive material precursor is printed, for example, by inkjet printing, to form the appropriate electrode pattern. In the case where a catalytic precursor ink is used, the process involves treating the precursor ink to convert the precursor ink to a final conductive material, for example, by electroless plating. In another example, the substrate may be uniformly coated with a catalytic photosensitive ink. The ink may be exposed to UV light through a photomask or vector-exposed to UV light from a laser or other suitable light source and rinsed with solvent to wash away the unexposed ink. The remaining ink may be immersed in a metal plating bath to form the fine conductive lines. Suitable catalytic inks are commercially available.

In step 806, respective portions of one or more of the radiating element, the electrodes of the touch sensor, and the connecting lines may be selectively removed. For example, one or more etch process steps may be used. An example of a suitable etching liquid for use in removing exposed ITO is an etching acid. Examples of a suitable removal liquid for the photoresist include organic solvents. Other suitable positive and negative photoresists, etching liquids and photoresist removal liquids may be used. As another example, ITO may be deposited on a substrate by sputtering ITO onto the substrate using a shadow mask having a pattern suitable for formation of electrodes in any of the shapes as described above.

In certain embodiments where two or more of the radiating element, the electrodes of the touch sensor, and the electrode connecting lines are formed of ITO or PEDOT and formed on the same surface of the same substrate, then the various elements of the to be formed of ITO or PEDOT may be formed at the same time during the same processing step(s).

In certain embodiments, all or respective portions of the connecting lines and the radiating element may be formed of lines of the same opaque conductive material and may be formed on the same surface of the same substrate at the same time in the same processing step(s) as the various elements of opaque conductive material.

Although some example processes are given above for forming conductive elements of the touch sensing panel, any suitable way of forming these elements can be used in conjunction with the disclosure provided herein.

In certain embodiments described herein, the touch sensor may be a mutual capacitance sensor in which drive and sense electrodes are formed on different surfaces of the same substrate or on two different substrates. However, the touch sensor may be any suitable form of touch sensor. Further examples of types of sensors usable as the touch sensor include self-capacitance sensors in which electrodes may be formed on one surface of a substrate or mutual capacitance sensors in which drive and sense electrodes are formed on the same surface.

In the case where electrodes of the touch position sensor are formed on two surfaces, then similar material or similar processing steps may be used in forming touch position sensor electrodes on both surfaces.

The same process may be applied to certain capacitive touch sensing panels in which electrodes and a radiating element are formed on a common substrate surface.

Figure 9:
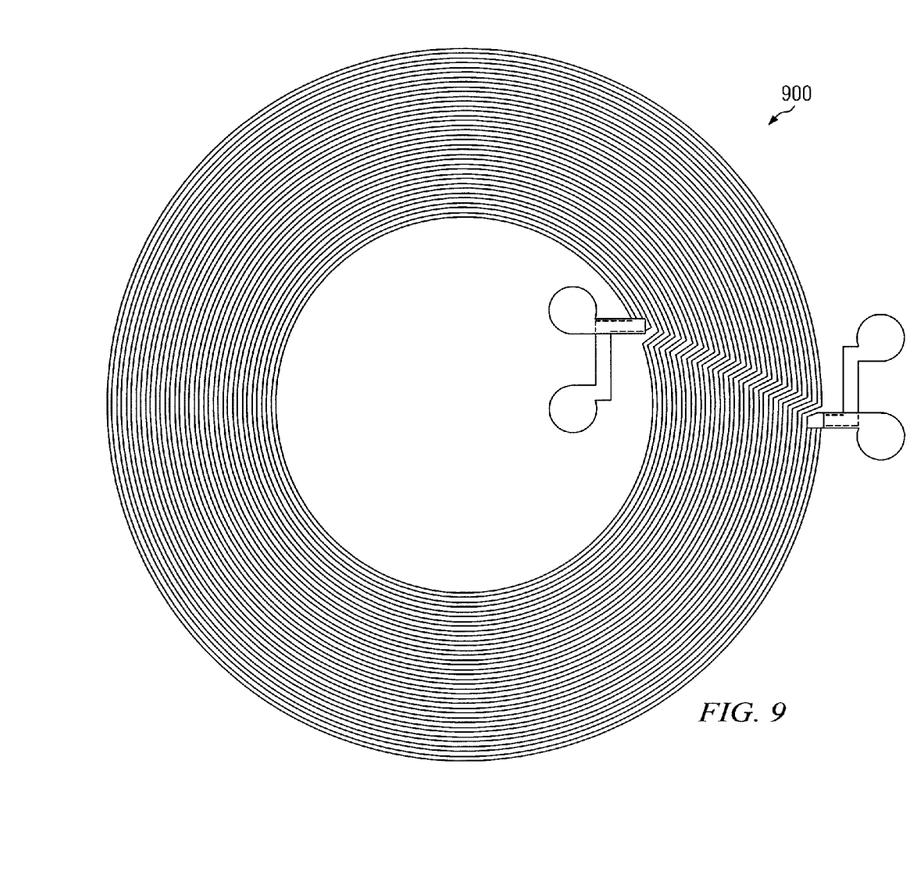
FIGS. 9 and 10 illustrate radiating elements according to alternative embodiments, which may be used in place of the radiating elements shown in FIGS. 2-3 and 6-7.
Figure 10:
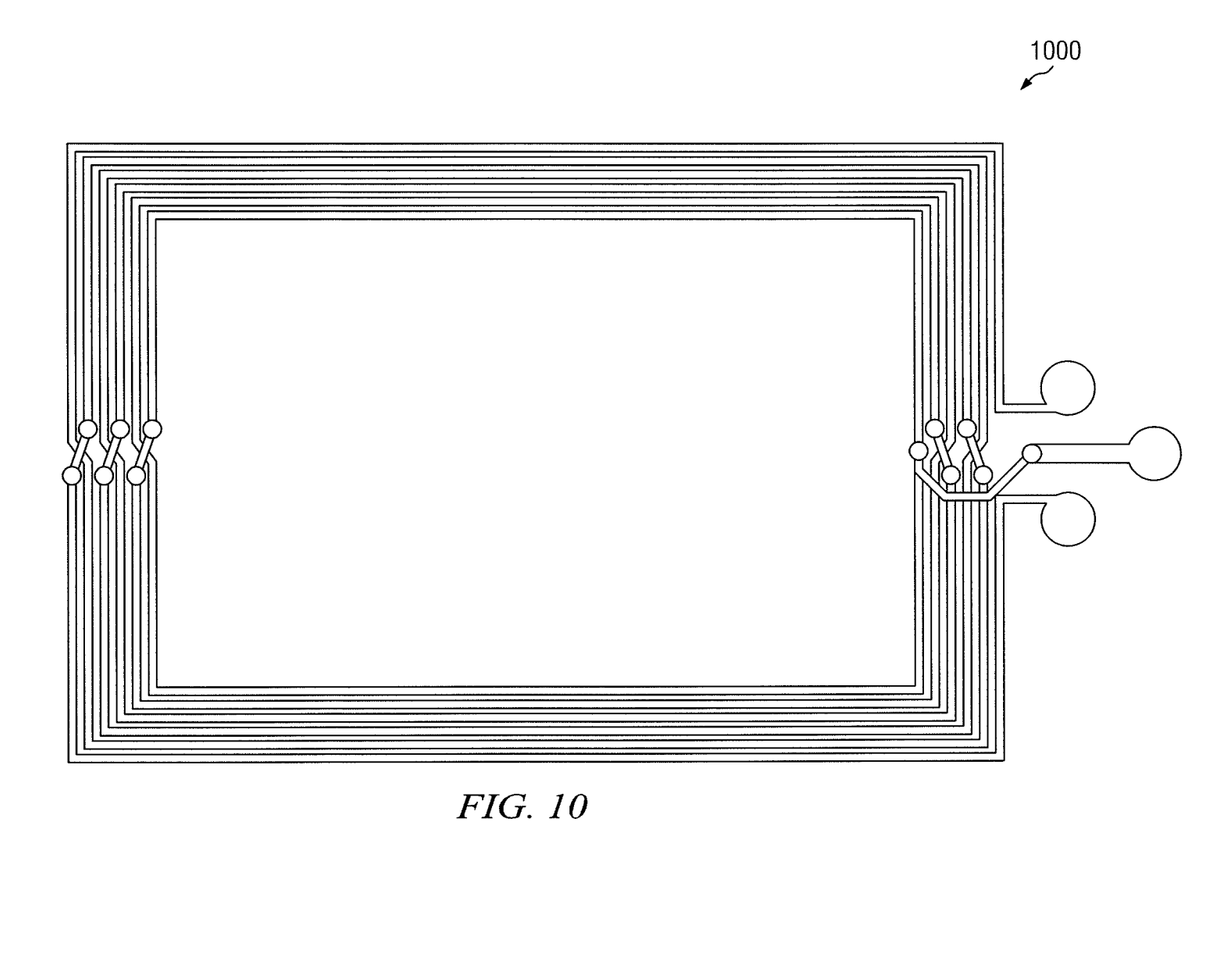

FIGS. 9 and 10 illustrate radiating elements 900 and 1000 according to alternative embodiments, which in certain embodiments may be used in place of radiating elements 206, 306, 606, or 706 described above. Radiating elements 900 and 1000 each include respective conductive coils that may be used, for example, to transmit or receive radio waves or to receive inductive charge. As shown in FIG. 9, two connection regions 910A and 910B are interconnected by conductive coils 920. Each connection region 910A and 920B may have two respective ends bridged together by conductive tracking 930A and 930B, respectively. In certain embodiments, tracking 930A and 930B may be electrically isolated from conductive coils 920. As shown in FIG. 10, certain portions of conductive lines may be spaced apart from (e.g. by a dielectric or an air gap) and overlap certain portions of other lines, such that those two lines are electrically isolated from each other.

The capacitive sensors described herein can be coupled to numerous electronic devices. Examples of the electronic devices include computers, personal digital assistants, satellite navigation devices, mobile phones, portable media players, portable game consoles, public information kiosks, point of sale systems and appliances. At least some of these types of electronic devices may include a central processor or other processing device for executing program instructions, an internal communication bus, various types of memory or storage media, for code and data storage and one or more network interface cards or ports f( )f communication purposes.

An RFID tag, included in a panel with a touch position sensor as described herein, may be used to transmit information to or exchange information with a reader, for example in order to make payments, locking or unlocking doors or other objects, or to track movement of a device containing the RFID tag.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a flexible substrate having flexible conductive material disposed thereon;
   a radiating element disposed on a first region of the flexible substrate, the radiating element comprising a first portion of the flexible conductive material;
   a touch-sensing area disposed on a second region of the flexible substrate, the touch-sensing area comprising a plurality of electrodes each comprising a respective second portion of the flexible conductive material disposed on the flexible substrate, the plurality of electrodes configured to sense touch of an object at the touch-sensing area;
   a plurality of connecting lines disposed on the second region of the flexible substrate such that the entirety of the plurality of connecting lines is laterally offset from the radiating element, the plurality of connecting lines operable to connect the touch-sensing area to control circuitry; and
   wherein the flexible substrate is folded upon itself such that the radiating element disposed on the first region of the flexible substrate is disposed inwardly from the touch-sensing area disposed on the second region of the flexible substrate.

2. The apparatus of claim 1, wherein the radiating element is selected from the group consisting of:
   a radio-frequency identification (RFID) tag;
   a near field communication (NFC) enabled antenna;
   a wireless fidelity (Wi-Fi) enabled antenna;
   a loop antenna; and
   an inductive charge receiver.

3. The apparatus of claim 1, wherein the plurality of electrodes comprise:
   a drive electrode disposed on a first surface of the flexible substrate; and
   a sense electrode disposed on a second surface of the flexible substrate different from the first surface of the flexible substrate.

4. The apparatus of claim 1, wherein the plurality of electrodes are all disposed on a same surface of the flexible substrate with respect to each other.

5. The apparatus of claim 1, wherein the radiating element and at least a subset of the plurality of electrodes are each disposed on a same surface of the flexible substrate.

6. The apparatus of claim 1, further comprising control circuitry coupled to the touch-sensing area, the control circuitry being configured to sense the presence of an object in proximity to the touch-sensing area.

7. The apparatus of claim 1, wherein the first region of the flexible substrate is a flexible printed circuit (FPC) bonded to the second region of the flexible substrate.

8. An apparatus comprising:
   a flexible substrate having flexible conductive material disposed thereon;
   a radiating element disposed on a first region of the flexible substrate, the radiating element comprising a first portion of the flexible conductive material;
   a touch-sensing area disposed on a second region of the flexible substrate, the touch-sensing area comprising a plurality of electrodes each comprising a respective second portion of the flexible conductive material disposed on the flexible substrate, the plurality of electrodes configured to sense touch of an object at the touch-sensing area;
   a plurality of connecting lines disposed on the second region of the flexible substrate, the plurality of connecting lines operable to connect the touch-sensing area to control circuitry; and
   wherein the first region of the flexible substrate is a peninsula-shaped portion extending outwardly from the remainder of the flexible substrate.

9. An apparatus comprising:
   a flexible substrate having flexible conductive material disposed thereon;
   a conductive coil disposed on a first region of the flexible substrate, the conductive coil comprising a first portion of the flexible conductive material;
   a touch-sensing area disposed on a second region of the flexible substrate, the touch-sensing area comprising a plurality of electrodes each comprising a respective second portion of the flexible conductive material disposed on the flexible substrate, the plurality of electrodes configured to sense touch of an object at the touch-sensing area;
   a plurality of connecting lines disposed on the second region of the flexible substrate such that the entirety of the plurality of connecting lines is laterally offset from the conductive coil, the plurality of connecting lines operable to connect the touch-sensing area to control circuitry; and
   wherein the flexible substrate is folded upon itself such that the conductive coil disposed on the first region of the flexible substrate is disposed inwardly from the touch-sensing area disposed on the second region of the flexible substrate.

10. The apparatus of claim 9, wherein the conductive coil is selected from the group consisting of:
    a radio-frequency identification (RFID) tag;
    a near field communication (NFC) enabled antenna;
    a wireless fidelity (Wi-Fi) enabled antenna;
    a loop antenna; and
    an inductive charge receiver.

11. The apparatus of claim 9, wherein the plurality of electrodes comprise:
    a drive electrode disposed on a first surface of the flexible substrate; and
    a sense electrode disposed on a second surface of the flexible substrate different from the first surface of the flexible substrate.

12. The apparatus of claim 9, wherein the plurality of electrodes are all disposed on a same surface of the flexible substrate with respect to each other.

13. The apparatus of claim 9, wherein the conductive coil and at least a subset of the plurality of electrodes are each disposed on a same surface of the flexible substrate.

14. The apparatus of claim 9, further comprising coupling the touch-sensing area to control circuitry, the control circuitry being configured to sense the presence of an object in proximity to the touch-sensing area.

15. The apparatus of claim 9, wherein the first region of the flexible substrate is a flexible printed circuit (FPC) bonded to the second region of the flexible substrate.

16. The apparatus of claim 9, wherein a same flexible substrate comprises both the first and second regions.

17. An apparatus comprising:
one or more flexible substrates having flexible conductive material disposed thereon;
an antenna disposed on a first region of the flexible substrates, the antenna comprising a first portion of the flexible conductive material;
a touch-sensing area disposed on a second region of the flexible substrates, the touch-sensing area comprising a plurality of electrodes each comprising a respective second portion of the flexible conductive material disposed on the flexible substrates, the plurality of electrodes configured to sense touch of an object at the touch-sensing area;
a plurality of connecting lines disposed on the second region of the flexible substrates such that the entirety of the plurality of connecting lines is laterally offset from the antenna, the plurality of connecting lines operable to connect the touch-sensing area to control circuitry; and
wherein the one or more flexible substrates is folded upon itself such that the antenna disposed on the first region of the flexible substrates is disposed inwardly from the touch-sensing area disposed on the second region of the flexible substrates.

18. The apparatus of claim 17, wherein the antenna is selected from the group consisting of:
a radio-frequency identification (RFID) tag;
a near field communication (NFC) enabled antenna;
a wireless fidelity (Wi-Fi) enabled antenna; and
a loop antenna.

19. The apparatus of claim 17, wherein the plurality of electrodes comprise:
a drive electrode disposed on a first surface of the flexible substrates; and
a sense electrode disposed on a second surface of the flexible substrate different from the first surface of the flexible substrates.

20. The apparatus of claim 17, wherein the plurality of electrodes are all disposed on a same surface of the flexible substrates with respect to each other.

21. The apparatus of claim 17, wherein the antenna and at least a subset of the plurality of electrodes are each disposed on a same surface of the flexible substrates.

22. The apparatus of claim 17, further comprising control circuitry coupled to the touch-sensing area, the control circuitry being configured to sense the presence of an object in proximity to the touch-sensing area.

23. The apparatus of claim 17, wherein the first region of the flexible substrates is a peninsula-shaped portion extending outwardly from the remainder of the flexible substrates.

24. The apparatus of claim 17, wherein the first region of the flexible substrates is a flexible printed circuit (FPC) bonded to the second region of the flexible substrates.

25. The apparatus of claim 17, wherein a same flexible substrate comprises both the first and second regions.

* * * * *